United States Patent [19]

Charransol et al.

[11] 3,865,991

[45] Feb. 11, 1975

[54] SIGNAL ROUTING DEVICE FOR A PARALLEL TRANSMISSION AND/OR SWITCHING NETWORK OF CODED SIGNALS

[75] Inventors: Pierre Charransol; Jacques Hauri, both of Paris; Serge Robert Fontana, Elancourt, all of France

[73] Assignee: International Standard Electric Corporation, New York, N.Y.

[22] Filed: June 28, 1973

[21] Appl. No.: 374,312

[30] Foreign Application Priority Data

July 13, 1972 France ............................ 72.25409

[52] U.S. Cl.... 179/15 BF, 179/15 BY, 179/175.3 R

[51] Int. Cl. ............................................ H04j 3/14

[58] Field of Search..... 179/15 BF, 15 BY, 175.2 R, 179/175.2 C, 175.3 R, 175.25, 15 AT

[56] References Cited

UNITED STATES PATENTS

| | | | |
|---|---|---|---|
| 2,680,162 | 6/1954 | Brehm | 179/15 BF UX |
| 3,364,467 | 1/1968 | Haibt | 179/175.3 UX |
| 3,597,548 | 8/1971 | Drinnan | 179/15 AT |
| 3,603,736 | 9/1971 | Morroll | 179/15 BF |

OTHER PUBLICATIONS

Lynch Catalog; Section 4, page 2002, Item B301; "T1 Span Line Switching System;" Oct. 1, 1971.

*Primary Examiner*—David L. Stewart
*Attorney, Agent, or Firm*—Delbert P. Warner; James B. Raden

[57] ABSTRACT

In a PCM switching network, a signal routing device is disclosed for diverting signals from a faulty section of the network to an emergency section. All the transmission paths included between the emergency section and the faulty section are shifted by one step towards the emergency section. At the outputs the reverse shift is performed.

2 Claims, 6 Drawing Figures

SIGNAL ROUTING DEVICE FOR A PARALLEL TRANSMISSION AND/OR SWITCHING NETWORK OF CODED SIGNALS

BACKGROUND OF THE INVENTION

1. Field of the Invention

The present invention relates to a signal routing device for a parallel transmission and/or switching network for coded signals and, more particularly, to a routing device provided for use with each input and output and making it possible to route at the input $n$ signals on $n$ among $n + 1$ transmission and/or switching paths and to perform the reverse routing at the output. It is in particular serviceable in telephone exchanges employing time division switching of pulse code modulation signals.

2. Description of the Prior Art

At the inputs of such an exchange, the signals from the lines are sampled at 8 kHz and each sample is converted into an 8-bit coded combination. Each 8-bit combination is transmitted in parallel on 8 conductors in a very short time constituting a channel time slot. It is possible to time-multiplex 256 channels for example. The recurring period of the successive combinations of a channel is 125 $\mu$s whereas the duration of each time slot is about 500 ns. An incoming multiplex group thus rotates the signals from 256 lines. A similar outgoing multiplex group routes the signals towards the same 256 lines. The above-mentioned numerical values, without being necessary, are nevertheless currently admitted.

Inside the exchange, it is necessary that a coded combination appearing on a time channel of a multiplex group be retransmitted on any time channel of any multiplex group. This entails space switching operations (connections from group to group) and time switching operations (connections from channel to channel). They will be carried out by means of a network including space switches and stores. This network may be, for example, of the well-known space-time-space type. A connection path between an incoming channel of a first line (A) and an outgoing channel of a second line (B) uses two space switches arranged, in a way, on each side of a memory cell; they give it access, one to the incoming multiplex groups, the other to the outgoing multiplex groups. In this way, at the time slot assigned to the incoming channel and through the first switch orientated onto the appropriate incoming group, a coded combination originated from the incoming channel is stored in the memory cell. At the time slot assigned to the outgoing channel and through the second switch orientated onto the appropriate outgoing group, the coded combination originated from the incoming channel and kept in the memory cell is retransmitted on the outgoing channel. The connection in the opposite direction, between the outgoing channel of the first line (A) and the incoming channel of the second line (B) is carried out in the same way and uses generally the same memory cell.

In practice, the necessary numerous memory cells are memory cells belonging to several speech stores and two space switches are associated with each store. In a speech store, it is necessary to accede twice at least to each memory cell in a 125 $\mu$s cycle, the first time, at the time slot assigned to the incoming channel and the second time, at the time slot assigned to the outgoing channel, each switch being accordingly orientated at these determined instants. The other cells of the same store make it possible to establish other calls, provided that they concern each time different time channels.

In such an exchange, the space switches are used, by time multiplexing, for a great number of calls. It is the same for the speech store common circuits and, in a general way, for all circuits transmitting and/or switching the coded combinations. A failure in any of these circuits will thus affect all the calls using the faulty circuit. This cannot be accepted.

The French Pat. application No. 71 07697 filed on Mar. 5, 1971 in the name of the "Compagnie Générale de Constructions Téléphoniques" entitled "Réseau de transmission et/ou de commutation pour signaux codés" (coded signal transmission and/or switching network) describes in a general way a switching network designed for obviating the effects of such a failure. This network provided for the parallel transmission and/or switching of coded signals, is constituted by the juxtaposition of several independent network sections each provided for transmitting and/or switching one single bit of the coded combinations in order that a failure, wherever it occurs, affects only one bit of the coded combinations, which both facilitates the detection of any failure and makes it possible to correct or minimize its effects.

Each switch is thus constituted by several independent elementary switches each one switching one bit of the coded combinations; these elementary switches are obviously parallel-controlled in order to have always the same orientation. Similarly, each store is constituted by several elementary stores, each storing one bit of the coded combinations; these elementary stores are parallel-controlled.

Moreover, if the coded combinations include $n$ bits, the network includes at least $n$+1 sections, whereas signal routing means are associated with the inputs and the outputs and make it possible to associate the $n$ bits of each combination with $n$ sections designated among the $n$+1 networks sections. Therefore, if a failure occurs in any elementary unit transmitting the coded combinations, the concerned bit is routed onto an undamaged network section.

SUMMARY OF THE INVENTION

However, as each bit of the coded combinations must be able to be routed onto an emergency section, it is obvious that the emergency section does not present a transmission path identical to the others. Now, for propagation reasons, all paths provided must be practically identical, the system performances being determined by those of the worst transmission path. The present invention thus offers a particular routing mode making it possible to fulfil this condition and thus concerns generally a signal routing device for a parallel transmission and/or switching network of coded signals.

The routing device according to the invention has $n$ signal accesses arranged according to a certain order and $n$+1 network accesses also arranged according to a certain order and corresponding to $n$+1 network sections. It includes normal switching means associating, in rest condition, the $n$ signal accesses with the $n$ network accesses of corresponding ranks, the $n$+1th network access of rank $p$ corresponding to the emergency section network. It is mainly characterized in that it also includes switching means "onto emergency" provided for associating, in case of failure in one network section of rank $m$, the signal accesses of ranks $m$ to $p-1$ to the network accesses of ranks $m+1$ to $p$, so that each signal access is connected either to the network access of same rank, at rest, or to the network access of the following rank, in case of failure, which modifies very little the transmission conditions of this signal.

According to another feature of the invention, the emergency network section occupies a central position of rank $i$ and two groups of normal switching means associate, in rest condition signal accesses arranged from 0 to $i-1$ and from $i+1$ to $n$ with network accesses of same ranks, whereas two groups of switching means "onto emergency" are provided, those of the first group associating selectively the signal accesses of ranks 0 to $i-1$ with the network accesses of ranks 1 to $i$, in case of failure in one of the network sections of ranks 0 to $i-1$ and in the way previously described, those of the second group associating selectively the signal accesses of ranks $i+1$ to $n$ with the network accesses of ranks $i$ to $n-1$, in case of failure in one of the network sections of ranks $i+1$ to $n$ and in a mode symmetrical to the preceding one, which simplifies the design of the switching "onto emergency" control circuits.

BRIEF DESCRIPTION OF THE DRAWINGS

Various other features will be disclosed from the following description given by way of non-limited example referring to FIGS. 1 to 6 which represent.

DESCRIPTION OF A PREFERRED EMBODIMENT

First will be described referring to FIG. 1, the block schematic of the circuits of a switching network wherein may be applied the present invention.

This network includes incoming multiplex groups such as GE1. To each of them corresponds an outgoing multiplex group such as GS1. Each multiplex group includes, for example, 256 time channels. To each time channel corresponds a channel time slot of about 500 ns during which is transmitted a coded combination on several conductors in parallel. The recurring period of a same channel time slot is 125 $\mu$s.

For the call establishment, several switching units are provided. For clarity reasons, in FIG. 1 there has been represented only one of them which includes a path store MT1, a speech store MP1, an incoming group switch CE1 and an outgoing group switch CS1.

All the units through which are transmitted the coded combinations, that is, in this case, the switches and the speech store, are made up of the juxtaposition of elementary units each transmitting one bit of the coded combinations. Thus, the switch CE1 is constituted by 9 elementary switches $CE1_0$ to $CE1_8$, identical and parallel-controlled. Each of them switches and transmits one bit, in a way totally independent of the others, so that a failure can only concern one bit at a time. Similarly, store MP1 is made up of 9 independent elementary stores $MP1_0$ to $MP1_8$ parallel-controlled and switch CS1 is constituted by 9 elementary switches $CS1_0$ to $CS1_8$.

It may be considered that the switching network is constituted by several network sections SR0 to SR8, one network section including all the elementary units transmitting one bit of the coded combinations.

The path store MT1 is a store having 256 cells cyclically read-out in synchronism with the multiplex group channel time slots. Each cell may contain an address of one cell of the speech store and a multiplex group number.

The speech store MP1 may have up to 128 memory cells which will be each assigned to one call. These memory cells are addressed according to information supplied by the path store MT1.

The switch CE1, during each channel time slot, associates the input of store MP1 to any incoming group, in response to the information supplied by a cell of the path store MT1.

The switch CS1, during each channel time slot, associates the output of store MP1 to any outgoing group. It always orientates in the same position as switch CE1.

Figure 2:
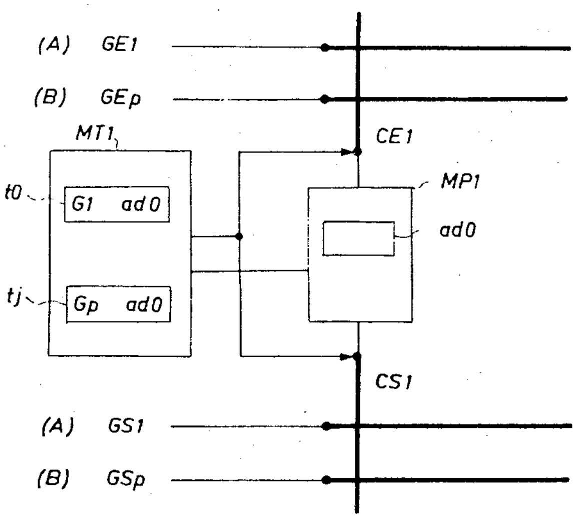
FIG. 2, an illustration of the contents of store MT1 and MP1 of FIG. 1.

The operation of this network will be described referring also to FIG. 2 and considering the case of a call between a subscriber (A) to which corresponds the channel time slot *t*0 on the incoming and outgoing groups CE1 and GS1, and another subscriber B to which corresponds the channel time slot *tj* on the incoming and outgoing groups GE*p* and GS*p*.

At the channel time slot *t*0 a cell of the path store MT1 supplies a group number G1 and an address *ad*0. This number is transmitted to switches CE1 and CS1, in parallel. In response, the latter orientate respectively onto groups GE1 and GS1. Simultaneously the address *ad*0 is transmitted to the speech store MP1. In the latter the memory cell corresponding to this address is successively the object of a reading and writing operation.

The information read-out at the address *ad*0 is transmitted to the multiplex group GS1, via switch CS1. Then, the information present on the multiplex group GE1, transmitted via switch CE1 to the input of the speech store MP1, is stored in lieu of that just read out, at the address *ad*0. Subscriber A has thus received a coded sample, whereas the one he supplied has just been recorded.

At the channel time slot *tj* a corresponding cell of path store MT1 supplies the group number G*p* and again, address *ad*O. Switches CS1 and CE1 are accordingly orientated onto groups GE*p* and GS*p*. The address *ad*0 is transmitted to speech store MP1.

The information read-out at address *ad*0 is transmitted to the outgoing multiplex group GS*p*, via switch CS1. Then, the information present on the incoming multiplex group GE*p*, transmitted via switch CE1 to store MP1, is recorded at the address *ad*0. Subscriber B thus receives the coded sample previously received from subscriber A and recorded at time slot *t*0. The coded sample he supplies has just been recorded at address *ad*0 and is kept until the next time slot *t*0 when it is transmitted to subscriber A.

It can thus be seen that the considered call between two subscribers to which correspond different channel time slots and multiplex groups, necessitates the two path store cells corresponding to these channel time slots in the path store, one memory cell in the speech store and the use of switches CS1 and CE1, at the appropriate time slots, in order to reach any multiplex group.

Figure 1:
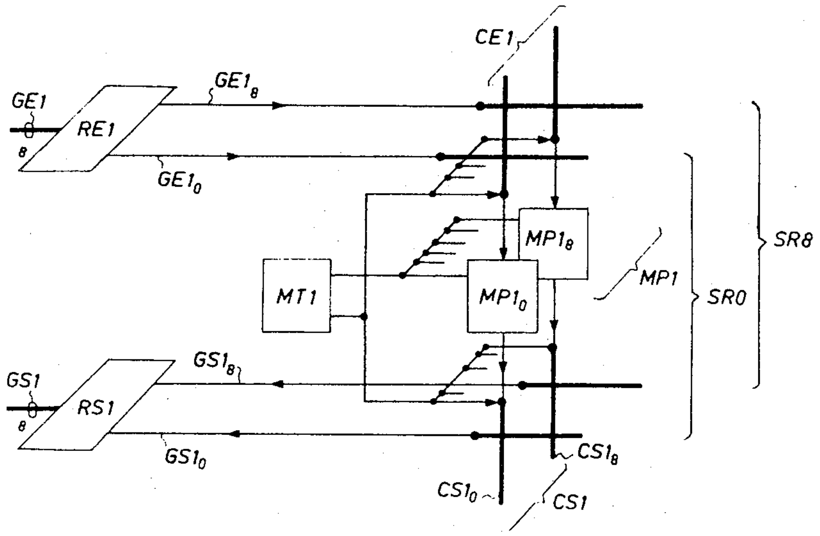
FIG. 1, the block schematic of a well-known time division switching network wherein may be applied the present invention.

Moreover, in FIG. 1 are represented equipments RE1 and RS1 associated with groups GE1 and GS1. Equipment RE1 receives the different bits of the coded combinations supplied in parallel by group GE1 and retransmits them on conductors $GE1_0$ to $GE1_8$. Equipment RS1 receives the different bits of the coded combinations appearing on conductors $GS1_0$ to $GS1_8$ and supplies coded combinations transmitted in parallel on group GS1. In case of failure, equipments RE1 and RS1 ensure the necessary switchings as will be described hereafter. These means, according to the invention, make it possible to remedy to the effects of any failure occurring in the switching network circuits.

Indeed, as an illustration, if the coded combinations transmitted on the incoming and outgoing groups have 8 bits, whereas the switching network includes 9 sections SR0 to SR8, equipment RE1 will route the 8 bits of the incoming combinations onto sections SR0 to SR3 and SR5 to SR8; equipment RS1 will supply the outgoing combinations by retransmitting the bits from said above sections. If a section fails, non-represented means will be provided which act upon equipments RE1 and RS1, as well as upon all identical equipments associated with the other multiplex groups, in order that these equipments route the 8 bits of the coded combinations onto the 8 undamaged network sections. These equipments thus enable, whichever is the network section where a failure has occurred, the routing of the coded combination bits onto the network sections in good condition whereas the faulty section is in a way isolated.

The network in FIG. 1 thus enables the routing of 8 bits in case of failure and of a 9th bit in the absence of failure. As the incoming and outgoing multiplex groups have 8 bits, the 9th network section (SR4) is not used in the absence of failure. However, equipment RE1 may advantageously add to the 8 bits of the multiplex group GE1 a parity bit, whereas equipment RS1 may include parity check means. The ninth network section (SR4) will be used for the routing of check bits helping to detect failures. In case of failure the 8 undamaged sections will be used for transmitting the 8 data bits, whereas the parity check will be disconnected until repair.

Now will be described referring to FIGS. 3 and 4, an embodiment of equipments RE1 and RS1 of FIG. 1, according to the invention.

Conventionally, in the following description, the AND gates have been represented by a dot surrounded by a circle (symbol of logic intersection), the OR gates by a cross surrounded by a circle (symbol of logic union) and the bistables by two juxtaposed rectangles respectively containing digits 0 and 1; generally, the bistable inputs have not been represented and the outputs are located at the lower part of the rectangles.

Multiplex group GE1 supplies the 8-bit coded combinations. Consequently, there has been provided, in equipment RE1 of FIG. 3, a parity generator PE1 delivering on its output conductors or signal accesses *se*0 to *se*3 and *se*5 to *se*8 the 8 bits of the coded combinations that it has received on its input conductors *ge*0 to *ge*7. It also delivers on its output conductor or parity access *se*4 a parity bit calculated from the preceding ones.

Equipment RE1 besides includes a set of 9 direct gates *pe*0 to *pe*8 enabling the transmission of the 9 bits provided by PE1 on the conductors or network accesses $GE1_0$ to $GE1_8$. Thus, gates *pe*0 to *pe*3 enabled by signals noted $\overline{N0}$ to $\overline{N3}$ connect the outputs *se*0 to *se*3 of the parity generator PE1 respectively to the network accesses $GE1_0$ to $GE1_3$ when signals $\overline{N0}$ to $\overline{N3}$ are present. It is the same for gates *pe*5 to *pe*8 which, in presence of signals $\overline{N5}$ to $\overline{N8}$, connect the outputs *se*5 to *se*8 of the parity generator PE1 respectively to the network accesses $GE1_5$ to $GE1_8$. Finally, gate *pe*4, in presence of condition N4, connects the output *se*4 of generator PE1 to conductor $GE1_4$.

Equipment RE1 includes a set of eight transfer gates *pf*0 to *pf*3 and *pf*5 to *pf*8. These gates are respectively controlled by signals referenced N0 to N3 and N5 to N8, complementary of the respective signals $\overline{N0}$ to $\overline{N3}$ and $\overline{N5}$ to $\overline{N8}$. These gates associate each output of the parity generator to the neighbouring network section. Indeed, when condition $\overline{N0}$ disappears, thus when condition N0 is present, gate *pf*0 becomes conducting whereas gate *pe*0 becomes non-conducting; the bit of the coded combinations supplied by the parity generator PE1 on its output *se*0 is transmitted, through gate *pf*0, to conductor $GE1_1$ and to the network section SR1. Similarly, when condition $\overline{N3}$ disappears, thus when condition N3 is present, gate *pf*3 associates the output *se*3 of generator PE1 to the neighbouring section SR4; condition NR is then cancelled.

In a symmetric way, in presence of condition N8, gate *pf*8 associates the output *se*8 of generator PE1 to section SR7; when condition N5 is present, gate *pf*5 associates the output *se*5 of generator PE1 to the neighbouring section SR4, condition N4 being cancelled.

In conclusion gates *pf*0/3 associate respectively each signal access *se*0 to *se*3 with the neighbouring network section, according to a shift by one step towards the right, and gates *pf*5/8 associate respectively each signal access *se*5 to *se*8 with the neighbouring section, according to a shift by one step towards the left.

As soon as a failure appears in network section SR3, condition $\overline{N3}$ disappears and condition N3 appears. Condition N4 is removed. As above-seen, gates *pe*3 and *pe*4 are non-conducting and gate *pf*3 becomes conducting. Conductor $GE1_3$ and section SR3 are isolated; the parity bit supplied by generator PE1 on its output *se*4 is no longer transmitted to conductor $GE1_4$; the coded combination bit supplied by generator PE1 on its output *se*3 is transmitted via gate *pf*3 and conductor $GE1_4$ to the emergency section SR4.

When a failure appears in network section SR0, conditions $\overline{N0}$ to $\overline{N3}$ as well as condition N4 disappear and conditions N0 to N3 appear. Gates *pe*0 to *pe*4 are blocked and gates *pf*0 to *pf*3 become conducting. Conductor $GE1_0$ and section SR0 are isolated; the parity bit is no longer transmitted to conductor $GE1_4$. The data bit supplied on output *se*0 of generator PE1 is transmitted, via gate *pf*0 and conductor $GE1_1$ to section SR1; the data bit supplied on the output *se*1 is transmitted, via gate *pf*1 and conductor $GE1_2$, to section SR2 and so on up to the data bit supplied on the output *se*3 which is transmitted as previously, via gate *pf*3 and conductor $GE1_4$ to the emergency section SR4.

It is now assumed that a failure occurs in network section SR5; condition N5 appears, conditions N4 and $\overline{N5}$ disappear; gate *pf*5 becomes conducting, gates *pe*5 and *pe*4 are blocked. Conductor $GE1_5$ and section SR5 are isolated; the parity bit supplied by generator PE1 on its output *se*4 is no longer transmitted to conductor $GE1_4$. The data bit supplied on the output *se*5 is transmitted via gate *pf*5 and conductor $GE1_4$ to the emergency section SR4.

If it is finally assumed that a failure occurs in network section SR8; condition N8 to N5 appear and conditions N4 and $\overline{N8}$ to $\overline{N5}$ disappear. Gates *pe*8 to *pe*4 are blocked and gates *pf*8 to *pf*5 become conducting; conductor $GE1_8$ and section SR8 are isolated, the parity bit is no longer transmitted to conductor $GE1_4$. The data bit supplied on the output *se*8 is transmitted via gate *pf*8 and conductor $GE1_7$, to the network section SR7; the data bit supplied on the output *se*7 is transmitted via gate *pf*7 and conductor $GE1_6$ to the network section SR6 and so on up to the data bit, supplied on the output *se*5, which is transmitted via gate *pf*5 and conductor $GE1_4$ to the emergency section SR4.

In the switching center of FIG. 1, as soon as a failure occurs, this shift by one step towards the emergency section, of all paths included between this emergency section and the faulty section, is carried out in all input equipments such as RE1, as just described.

Now referring to FIG. 4, will be described an embodiment of the output equipment RS1.

Figure 3:
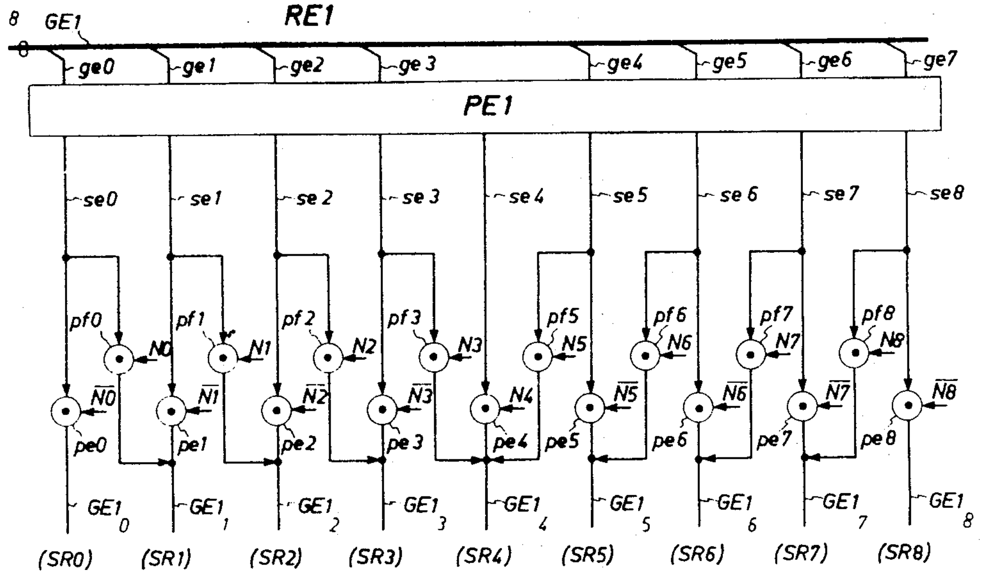
FIG. 3, an embodiment of the input equipment RE1 of FIG. 1, according to the invention.
Figure 4:
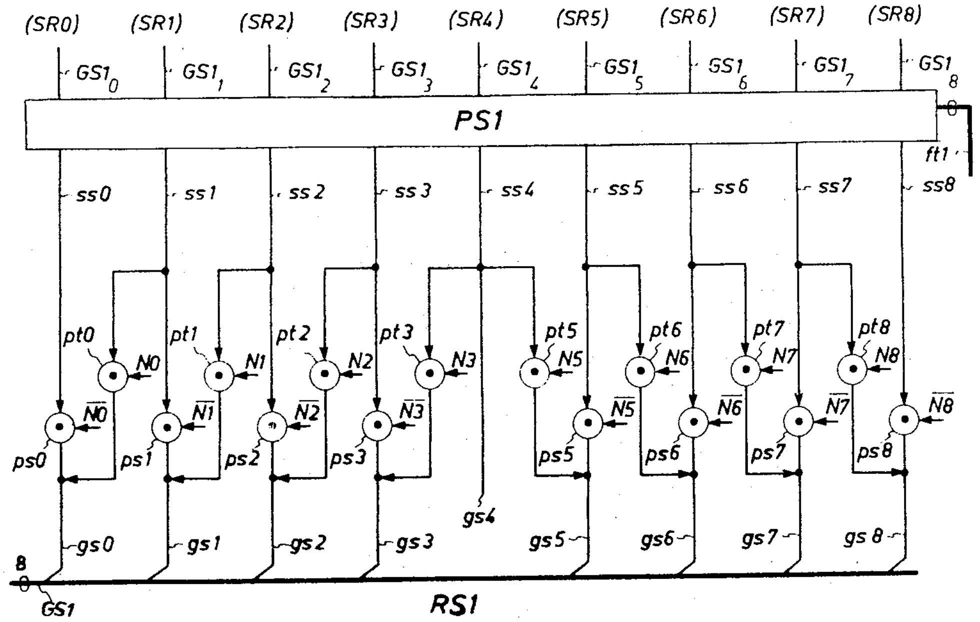
FIG. 4, an embodiment of the output equipment RS1 of FIG. 1, according to the invention.

Equipment RS1 includes a parity check circuit PS1 corresponding to circuit PE1 (FIG. 3). This circuit retransmits on its output conductors *ss*0 to *ss*8 the bits received respectively on its input conductors $GS1_0$ to $GS1_8$. In case of parity error, this circuit supplies on a group of conductors *ft*1 a combination which enables the identification of the faulty section.

Equipment RS1 includes moreover gates *ps*0 to *ps*3 and *ps*5 to *ps*8, for the direct transfer of the 8 coded combination bits, in the absence of failure, as well as transfer gates *pt*0 to *pt*3 and *pt*5 to *pt*8. Gates *pt*0 to *pt*3 and *pt*5 to *pt*8, on the one hand, and gates *ps*0 to *ps*3 and *ps*5 to *ps*8, on the other hand, are respectively controlled by conditions N0 to N3 and N5 to N8, on the one hand, and on the other hand, by their complements $\overline{N0}$ to $\overline{N3}$ and $\overline{N5}$ to $\overline{N8}$. Thus, gate *pt*0 becomes conducting by condition N0 for the connection of the output *ss*1 of circuit PS1 to conductor *gs*0, and gate *ps*0 becomes conducting by condition N0 for the direct connection of the output *ss*0 of circuit PS1 to conductor *gs*0. It is the same for gates *pt*1, *ps*1, *pt*2, *ps*2, . . . , *pt*8, *ps*8.

When a failure appears in the network section SR3, it has been seen that condition $\overline{N3}$ disappears and condition N3 appears and that consequently the data bit transmitted to the parity generator PE1 on conductor *ge*3 was transmitted, by input equipment RE1 (FIG. 3) to the emergency section SR4. This bit is thus presented to the parity check circuit PS1 on conductor $GS1_4$. This circuit retransmits it on the output conductor *ss*4. As gate *pt*3 has become conducting by condition N3, it retransmits said bit on the output conductor *gs*3. Therefore, in case of failure in the network section SR3, the bit of the coded combinations normally transmitted by this section takes, in the network of FIG. 1, the emergency section SR4. This shift takes place simultaneously at the network inputs and outputs. At the inputs, it routes the bit of the coded combinations which should be transmitted by the faulty section SR3 onto the emergency section SR4; at the outputs, it performs the reverse switching in order to give to the bit supplied by the emergency section the place it has in each coded combination.

It will be now assumed that a failure has occurred in the network section SR0. Conditions $\overline{N0}$ to $\overline{N3}$ disappear and conditions N0 to N3 appear. Gates *ps*0 to *ps*3 are disabled and gates *pt*0 to *pt*3 become conducting. The outputs *ss*1 to *ss*4 of the parity check circuit PS1 are associated respectively with conductors *gs*0 to *gs*3 via the respective gates *pt*0 to *pt*3.

Similarly, when a failure occurs in the network section SR5, condition $\overline{N5}$ disappears and condition N5 appears. Gate *pt*5 becomes conducting and gate *ps*5 is blocked. The output *ss*4 of the parity check circuit PS1 is associated with conductor *gs*5 via gate *pt*5.

It is now assumed that a failure occurs in the network section SR8; conditions N8 to N5 appear and the complementary conditions $\overline{N8}$ to $\overline{N5}$ disappear. Gates *pt*8 to *pt*5 become conducting and gates *ps*8 to *ps*5 become non-conducting. The outputs *ss*7 to *ss*4 of circuit PS1 are associated respectively with conductors *gs*8 to *gs*5 via the respective gates *pt*8 to *pt*5.

In conclusion, when a failure appears in a network section, if, in input equipment RE1, the outputs of the parity generator PE1 and the gates are physically arranged as in FIG. 3, the different transmission paths remain practically unchanged. Indeed, when a failure occurs in one network section, the faulty transmission path is replaced by the neighbouring path. The well-known process, in which section SR4 is a common emergency section, necessitates a multiple at the input of this section, connected via additional control gates. This requirement deteriorates the electrical characteristics of the emergency path and, consequently the performances of the system which are determined by those of the worst path. This arrangement thus avoids the electric propagation problems due, in particular, to the multiple at the emergency section input. The same remarks apply to the circuits of output equipment RS1.

Figure 5:
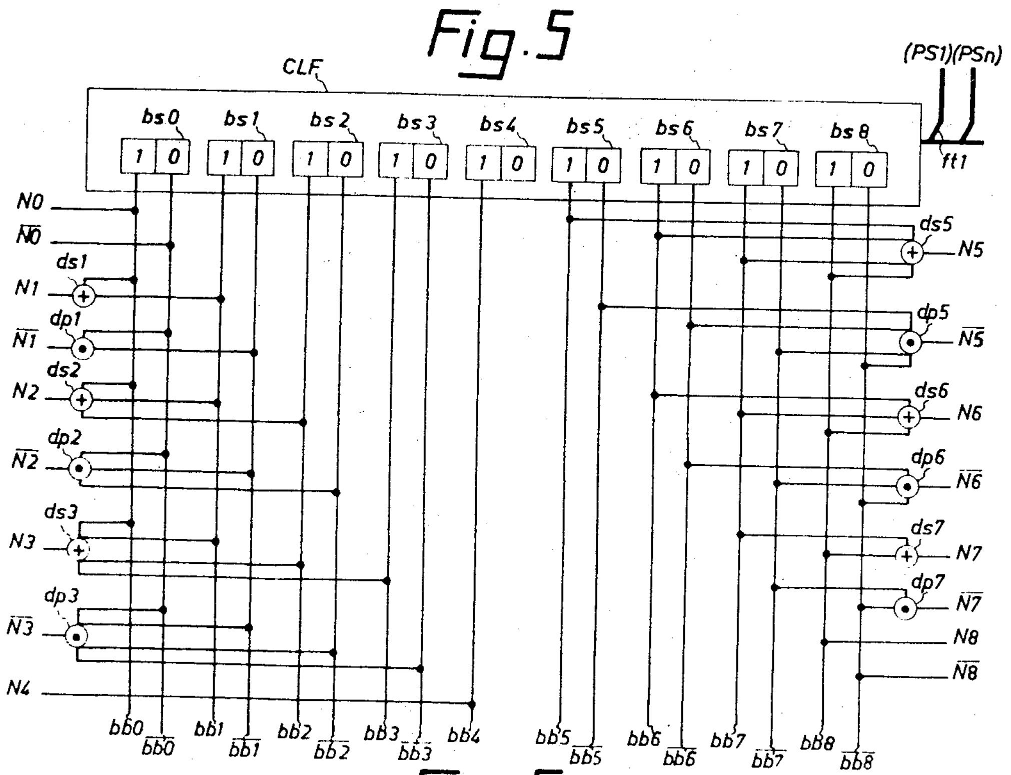
FIG. 5, an embodiment of the decoding circuits enabling the different control signals of FIGS. 3 and 4 to be obtained and FIG. 6, an embodiment of equipment RE1 of FIG. 3 enabling the routing of a possible check bit on the faulty section.

Now will be described, referring to FIG. 5, an embodiment of the decoding circuits making it possible to obtain the different conditions N0 to N8 and their complements $\overline{N0}$ to $\overline{N8}$ necessary to the operation of the circuits of FIGS. 3 and 4.

These decoding circuits, common to all multiplex groups include in particular a control circuit CLF. This circuit includes nine bistables *bs*0 to *bs*8. in the absence of failure, bistable *bs*4 is in position 1, the other bistables being reset. The different output conductors *bb*0, $\overline{bb0}$, $\overline{bb1}$ . . . $\overline{bb8}$ of these bistables are associated with six OR gates *ds*1 to *ds*3 and *ds*5 to *ds*7 as well as six AND gates *dp*1 to *dp*3 and *dp*5 to *dp*7; OR gate *ds*3 is thus associated with the direct outputs of bistables *bs*0 to *bs*3 and gate *dp*3 is associated with the complementary inputs of the same bistables. By giving to the output signals of the bistables the same references as the output conductors on which they appear, it may be written, N3 and $\overline{N3}$ being respectively the output signals of gates *ds*3 and *dp*3:

$$N3 = bb0 + bb1 + bb2 + bb3$$
$$\overline{N3} = \overline{bb0} \cdot \overline{bb1} \cdot \overline{bb2} \cdot \overline{bb3}$$

Analogous expressions describe the output signals N2/0 and N2/0 of gates *ds*2/0 and *dp*2/0 with:

$$N0 = bb0$$
$$\overline{N0} = \overline{bb0}$$

The functions supplied by the outputs of OR gates *ds*5/8 and AND gates *dp*5/8 will be expressed in the same way, from:

$$N5 = bb5 + bb6 + bb7 + bb8$$
$$\overline{N5} = \overline{bb5} \cdot \overline{bb6} \cdot \overline{bb7} \cdot \overline{bb8}$$

up to:

$$N8 = bb8$$
$$\overline{N8} = \overline{bb8}$$

For homogeneousness reasons, the direct output *bb*4 of bistable *bs*4 will also be called N4.

In the absence of failure, bistables *bs*0/3 and *bs*5/8 are reset, whereas bistable *bs*4 is set.

It will be now assumed that a failure has occurred in section SR0 of the network of FIG. 1. The parity check circuit PS1 of output equipment RS1 of FIG. 4 detects this failure. It transmits the erroneous combinations on its output conductors *ft*1 towards the control circuit CLF, which enables the identification of the faulty section. It is the same for each parity check circuit PS1 to PS*n* of all the output equipments of the switching center which detects an erroneous combination. The analysis of these erroneous combinations, for example by integration, will enable the identification of the network section in which is located the fault. Then, if it is section SR0, bistable *bs*4 and bistable *bs*0 trigger, signal *bb*4 is no longer supplied and signal *bb*0 appears. There results the disappearance of combinations $\overline{N0}/\overline{N3}$ and N4 and the appearance of combinations N0/N3.

It can be also assumed that a failure has appeared in section SR8 of the network in FIG. 1. In response, bistables *bs*4 and *bs*8 of circuit CLF trigger. Signal *bb*8 appears and signal *bb*4 disappears. It results the appearance of combinations N8 to N5 and the disappearance of combinations $\overline{N8}/\overline{N5}$ and N4.

In summary, in the control circuit CLF, there is always one and one only bistable in position 1 which identifies the network section not to be used for the data bit transmission. The circuits of FIG. 5 then supply the conditions necessary to the input and output equipments of FIGS. 3 and 4.

Now referring to FIG. 6, will be described the operation of an input equipment enabling, in all cases, the check bit switching onto the faulty section, which facilitates, in particular, the identification of the faulty element of this section.

Figure 6:
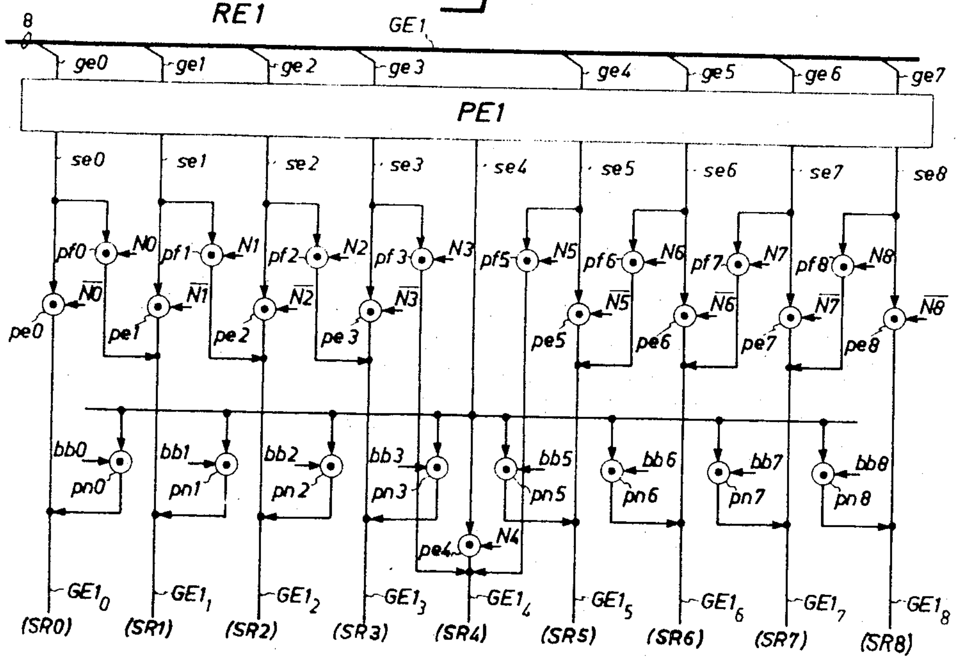

In FIG. 6, are found all the elements of FIG. 3 to which are added a set of 8 transfer gates *pn*0 to *pn*3 and *pn*5 to *pn*8. These gates are respectively controlled by the direct output signals *bb*0/*bb*3 and *bb*5/*bb*8 of bistables *bs*0/*bs*3 and *bs*5/*bs*8 of the control circuit CLF of FIG. 5. Thus, when signal *bb*3 appears, gate *pn*3 connects the output *se*4 of the parity generator PE1 to conductor $GE1_3$. It is the same for the other gates *pn*0 . . . *pn*8.

It is assumed that a failure has appeared in one of sections SR8 of the network in FIG. 1. It has been seen that it results in the appearance of signal *bb*8 and in the disappearance of signal *bb*4 and, consequently, in the appearance of combinations N8 to N5 and in the disappearance of combinations N4 and $\overline{N8}/\overline{N5}$. The outputs *se*8 to *se*5 of the parity generator are thus connected respectively to conductors $GE1_7$ to $GE1_4$. The check bit is no longer transmitted by the output *se*4 to conductor $GE1_4$, gate *pe*4 being blocked. But gate *pn*8 rendered conducting by signal *bb*8 routes the check bit on conductor $GE1_8$, towards section SR8.

It is obvious that the preceding description has only been given as an unrestrictive example and that numerous alternatives may be considered without departing from the scope of the invention. In particular, all numerical details have been given only to facilitate the understanding of the invention and may vary with each application.

We claim:

1. A signal routing system in a switching network for transmitting coded signals in parallel, the system comprising switching means coupling each input to an output of the network, said system having *n* signal accesses arranged according to a certain order and *n*+1 network accesses also arranged according to a certain order and corresponding to *n*+1 network sections, as well as normal switching means associating, in rest condition, the *n* signal accesses with the *n* network accesses of corresponding ranks, the *n*+1th network access of rank *p* corresponding to the emergency section network, the signal routing system comprising "onto emergency" switching means provided for associating, in case of failure in one network section of rank *m*, the signal accesses of ranks *m* to *p*−1 to the network accesses of ranks *m*+1 to *p*, whereby each signal access is connected either to the network access of the same rank, at rest, or to the network access of the following rank, in case of failure, the signal transmission conditions remaining almost the same in both cases.

2. A signal routing system in a switching network for transmitting coded signals in parallel, the system comprising switching means coupling each input to an output of the network, said system having *n* signal accesses arranged according to a certain order and *n*+1 network accesses also arranged according to a certain order and corresponding to *n*+1 network sections, as well as two groups of normal switching means associating, in rest condition, signal accesses arranged from 0 to *i*−1 and from *i*+1 to *n* with network accesses of the same rank, an emergency section occupying a central position of rank *i*, the signal routing system comprising two groups of switching means "onto emergency," those of the first group associating selectively the signal accesses of ranks 0 to *i*−1 with the network accesses of ranks 1 to *i*, in case of failure in one of the network sections of ranks 0 to *i*−1 and those of the second group associating selectively the signal accesses of ranks *i*+1 to *n* with the network accesses of ranks *i* to *n*−1, in case of failure in one of the network sections of ranks *i*+1 to *n*, thereby simplifying the design of the "switching onto emergency" control circuits.

* * * * *